United States Patent [19]
Oertel

[11] Patent Number: 4,854,794
[45] Date of Patent: Aug. 8, 1989

[54] CONNECTOR OF THE NUT-AND-BOLT TYPE
[75] Inventor: Klaus Oertel, Osterode/Harz, Fed. Rep. of Germany
[73] Assignee: Kamax-Werke Rudolf Kellermann GmbH & Co. KG, Osterode/Harz, Fed. Rep. of Germany
[21] Appl. No.: 3,734
[22] Filed: Jan. 16, 1987
[30] Foreign Application Priority Data
Jan. 18, 1986 [DE] Fed. Rep. of Germany ....... 3601389
[51] Int. Cl.⁴ ............................................. F16B 39/30
[52] U.S. Cl. ..................................... 411/307; 411/393
[58] Field of Search ............... 411/263, 285, 288, 290, 411/307, 393, 436, 937.1
[56] References Cited
U.S. PATENT DOCUMENTS

| 361,289 | 4/1887 | Howes | 411/307 |
|---|---|---|---|
| 909,118 | 1/1909 | Richards et al. | 411/307 |
| 2,553,337 | 5/1951 | Shafer | 411/393 X |
| 2,870,668 | 1/1959 | Flahaut | 411/436 |
| 3,143,029 | 8/1964 | Brown | 411/393 |

FOREIGN PATENT DOCUMENTS
0065344 11/1982 European Pat. Off. ............ 411/263
2439832 3/1976 Fed. Rep. of Germany ...... 411/263

Primary Examiner—Gary L. Smith
Assistant Examiner—Curtis B. Brueske
Attorney, Agent, or Firm—Max Fogiel

[57] ABSTRACT

A connector of the nut-and-bolt type with a bolt that has an external thread and/or a nut that has an internal thread. The connector has a locking device that provides a moment of friction that counteracts the unscrewing moment. The pitch of the external thread differs from that of the internal thread. The external thread is screwed far enough into the internal thread or vice versa for the moment of friction of the locking device to result, once the flank clearance between the two threads has been completely occupied and exceeded, from the forces that occur during resilient deformation.

10 Claims, 4 Drawing Sheets

CONNECTOR OF THE NUT-AND-BOLT TYPE

BACKGROUND OF THE INVENTION

The invention concerns a connector of the nut-and-bolt type with a bolt that has an external thread and/or a nut that has an internal thread and with a locking device that provides a moment of friction that counteracts the unscrewing moment. The invention can be realized in bolts manufactured for use with nuts of standard pitch for example. The nut can be in the form of a threaded bore in a solid structure, the engine of a motor vehicle for example. It is on the other hand also possible for the invention to be embodied in a nut intended for use with a bolt of standard pitch. Finally, the invention can be embodied in either a bolt or in a nut if both have non-standard pitches that match.

The failure of a connector of the nut-and-bolt type is as is known ascribed either to loosening or to unscrewing. A nut-and-bolt type connector becomes loose when the binding power decreases or vanishes subject to axial stress due either to inadequate initial tightening, too high a setting, or excessive relief of the attached components, etc. What makes a nut-and-bolt type connector unscrew on the other hand are usually oscillating, jolting, or vibrating transverse forces perpendicular to the axis of the bolt. The friction on the threads and/or below the head of the bolt and hence the persistence of the connection accordingly soon decrease or vanish completely. The present invention aims at a locking device that will prevent unintended unscrewing.

A connector of the aforesaid type already has a locking device. The moment of friction that counteracts the unscrewing moment is provided by applying a microencapsulated adhesive to either the external or internal thread. When the nut and bolt are screwed together, the adhesive is activated and cures in the absence of air. This increases the moment of friction in the thread. The microencapsulated adhesive can be adapted to various conditions and will also resist mechanical stress and temperatures up to approximately 110° C. Since the full effect of the locking device will of course occur only when the connector is employed for the first time, the structure is not appropriate for example for a set screw, which often has to be readjusted.

Applying a resilient and deformable plastic to the external or internal thread in order to contribute to the moment of friction is also known. Since a locking device of this type will deform and remain deformed when first employed, however, absolute reliability can no longer be expected when the connector is activated and employed again.

Locking components of the type addressed herein can also be obtained for example by providing the supporting surface of the head of a headed bolt or screw with teeth to increase the moment of friction at that point. The teeth lock into the matching support surface of the work piece. Prerequisite, however, is that the teeth can work themselves into the work-piece material, which accordingly must not be harder that the stock that the bolt is made out of.

All of these known locking devices are subject to certain restrictions in relation to reusability, resistance to oil, solvents, and temperature, the material that the mating structure is made out of and its hardness, and persistence of action. A common drawback is the necessity for further processing or application of the locking device.

Providing the thread on the bolt and the thread on the nut with different pitches to distribute the load more evenly over the flights is on the other hand also known in relation to connectors of the nut-and-bolt type that lack locking devices to prevent unscrewing (Kaehler, "Means of distributing the load more uniformly over the supporting flights of a threaded connection" [in German], *Konstruktion* 12 [1952], 377-79). Uniform load on the separately connected thread flights can be obtained by making the pitch of the nut thread and the pitch of the bolt thread differ enough to be equal in the internal and external threads in relation to load per flight. When this ideal is approximated, the load on the initial supporting external thread is at least partly decreased. The difference between the pitch of the external thread and that of the internal thread is very small. A limiting condition for this distribution of forces is that the difference in pitches can never be greater than the flank clearance between the external and internal thread divided by the number of thread flights engaged. This ensures that the bolt can easily be mounted without grabbing.

Slightly different pitches between the external and internal threads have also been employed to increase the life of connectors of the nut-and-bolt type (Klein, "High-quality threaded connections: some principles of design and some new developments" [in German], *Konstruktion* [1959], 202-12 & 259-64). The improved distribution of forces and increased life depend on the known drawback that a conventional nut-and-bolt type connector, one with matching pitches that is, is essentially designed to transmit the forces in the vicinity of the first and of some of the following flights, whereas the other flights contribute nothing to the transmission of forces. Making the pitch of the external thread approximately 1 o/oo less steep than the pitch of the internal thread has the opposite effect and results in a more uniform distribution of forces over the individual flights along the depth of insertion. The consequence again is an effective extension of the life of the connection. There are of course practical problems in obtaining such slight differences in pitch to the requisite precision, and when the difference is too great the life of the connection will be shortened.

SUMMARY OF THE INVENTION

The object of the invention is to provide a connector of the aforesaid nut-and-bolt type with a locking device that will prevent unintended unscrewing and that can be obtained without additional measures like adhesive, teeth on the head support surface, etc.

This object is attained in accordance with the invention in that the pitch of the external thread differs from that of the internal thread and in that the external thread is screwed far enough into the internal thread or vice versa for the moment of friction of the locking device to result, once the flank clearance between the two threads has been completely occupied and exceeded, from the forces that occur during resilient deformation. The state of the art heretofore has provided for improved force distribution over the separate threads, and the concept that flank clearance must always exist even when the connector has been completely screwed or assembled together to allow easy mounting of the bolt and without seizing. The present invention intentionally departs from those concepts of the prior art. The connector is designed so that the bolt and nut can first be partly screwed together easily and without grabbing over the initial flights of the threads. At a certain point, however, the flank clearance gets completely occupied or extinguished, so that the beginning of a grabbing effect becomes perceptible. At this point as well, however, the two parts are not yet completely screwed together, and the threshold has not yet been attained. The grabbing is accordingly very intentionally exploited to incorporate the locking device. As the two parts continue to be screwed together and the threshold is exceeded, the bolt and/or the nut begin to get resiliently deformed, meaning that the thread flights rest against each other on different sides at two regions or points of the maximum depth of insertion. The flank clearance will, once it has been completely occupied, accordingly be exceeded over a range that occurs strictly within the resilient range of the connector. Permanent deformation of the parts of the connectors is not intended, allowing the connector to be reused many times.

The new connector has a number of advantages. The moment of friction generated by the grabbing in the thread flight is, since it occurs exclusively in the resilient range, reproducible almost to any extent desired. The locking action will accordingly be ensured even when the bolt is employed several times with the nut. The connector is extremely inexpensive to manufacture because a method of cutting threads that is in any case necessary and cannot be avoided of course in a connector of the type in question is exploited to embody the invention. What can be eliminated on the other hand are any additional measures like the application of plastic, microencapsulated adhesive, rifling of the head-contact surface, etc. Thus, the new connector is also resistant to oil, chemicals, temperature, etc., although the limits for the material that the connector is made out of must of course be respected. It is also practical that the locking device becomes effective immediately upon or subsequent to assembly. There is accordingly no waiting time as is necessary for example with a microencapsulated adhesive. Furthermore, the thread is not weakened by any grooves or special contours like fine threading for example because the flank design is thoroughly conventional. The new locking device also resists aging. The head-support surface will not be destroyed or damaged. A particular advantage is that the design in accordance with the invention does not result in any limitation on the strength or usefulness of the nut-and-bolt type connector. Finally, the application of the locking device is completely independent of the hardness and/or surface quality of the work piece or mating material. In specific applications, finally, there are other advantages in that the difference in pitch can also improve the supporting strength of the individual flights due to the controlled stress distribution in the thread. Surprisingly, in particular load situations relative to the corresponding design of the connector, the utility of the connector is not diminished by additional thread friction in the tensioned state. Both of these advantages also occur when the pitch of the external thread is less steep than that of the internal thread.

The difference between the pitch of the external thread and that of the internal thread is on the order of 0.5 to 3% and preferably of 1 to 2%. It is, however, not just this order of magnitude that is important, but how it relates to the depth of insertion. The depth of insertion must equal or preferably exceed the depth of insertion that exists until the initiation of the grabbing action and hence up to complete occupation of the flank clearance. This number of non-friction turns will be disproportionately high or excessively high when the pitch difference is too low, specifically below approximately 1%. The number of non-friction turns will on the other hand be proportionately low when the pitch difference is relatively high, in the range above 3% for example. The same is true of the number of additional turns up to maximum resilient deformation, the number of turns, that is, at which the grabbing action comes into effect. Thus, the intermediate range is the only one that can be exploited for the effect. The aforesaid applies to conventional pitches, not to fine threads.

The connector can, by appropriately selecting the design, material, and heat treatment, be made resilient enough to partly or completely eliminate the pitch difference and hence the moment of friction by means of resilient deformation in the insertion range when the tensioning forces occur. This effect is especially surprising and also allows the bolt to be employed in a practical way. When the tension is initially applied, when, that is the bolt or nut is first applied to the work piece, the starting torque, which actually tends to increase, becomes slightly weaker because the moment of friction subsides or disappears due to elastic lengthening of the tensioning parts and an elastic shortening of the tensioned parts. The moment of friction will, however, reappear immediately once the load has been relieved and will accordingly be completely effective as a locking device.

A nut-and-bolt type connector can be subjected to both tension and compression. The external thread can be smaller than the internal thread or vice versa. The different actions and advantages depend on the various combinations of these stress situations and on the associated design. These details must be taken into consideration when designing the connector. To exploit the load capacity of a nut-and-bolt type connector as a securing bolt it is a good idea for the moment of friction that characterizes the locking device to vanish in the stressed state. If, on the other hand, the connector is to be employed as a set screw, it will be practical for the moment of friction to remain in force during the stressed state to prevent the connector from unscrewing either in the stressed or in the unstressed state.

Various embodiments of the invention will now be described with reference to the drawings. wherein

DESCRIPTION OF THE PREFERRED EMBODIMENTS

Figure 1:
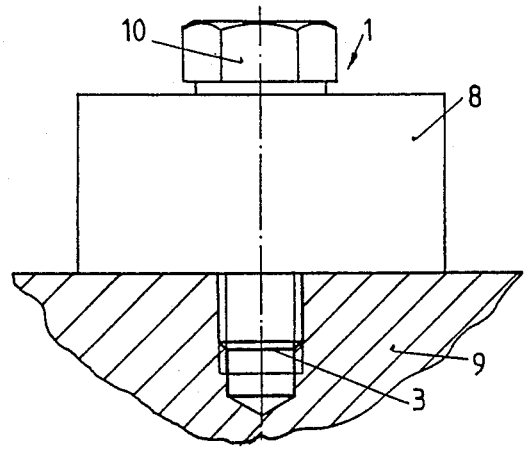
FIG. 1 illustrates a typical situation involving a securing bolt.

FIG. 1 illustrates a typical situation in which the invention is employed as a securing bolt. A bolt 1 extends through a part 8 that is to be tensioned, and its threaded shaft engages a tensioning part 9 that has an internal thread like a nut. The part 8 that is to be tensioned is compressed between the head 10 of bolt 1 and the surface of tensioning part 9 or subjected to an equivalent tension. To this extent the connector in accordance with the invention is identical with the state of the art of securing bolts.

Figure 2:
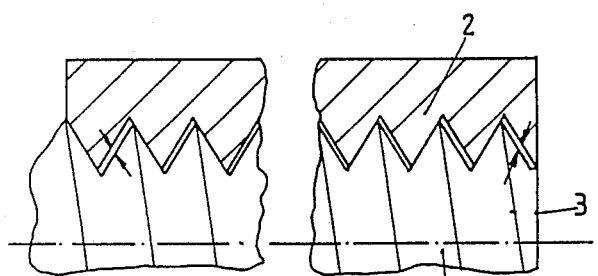
FIG. 2 is a schematic illustration of an embodiment of the connector employed in the situation illustrated in FIG. 1, with the pitch of the internal thread being steeper than that of the external thread, in the unstressed state.

FIG. 2 is a schematic illustration showing only bolt 1 and an associated nut 2 of the type in accordance with the invention when employed as a securing bolt like the one illustrated in FIG. 1. The only part of bolt 1 that is illustrated is the forward part, which is provided with a thread, with the free end 3 of bolt 1 completely screwed into nut 2. The height of the nut accordingly corresponds to the depth of insertion. This embodiment is designed such that the pitch $P_S$ of the external thread is less steep than the pitch $P_M$ of the internal thread. Thus the flights on bolt 1 are closer together and forced somewhat wider apart on nut 2. FIG. 2 illustrates the screwed-together but unstressed state.

It will be obvious that the flights on the nut will rest against those on the bolt at each end of nut 2, whereas they will not come into contact at the midsection. The contact between the flights at both ends of the nut results in a moment of friction that embodies or represents the locking device that prevents unscrewing.

Figure 3:
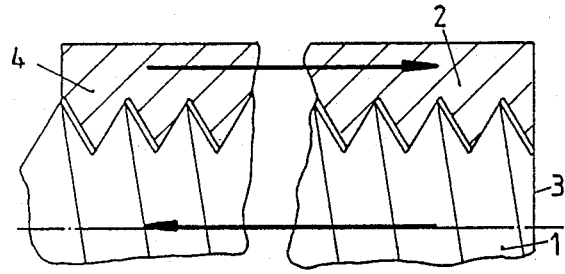
FIG. 3 illustrates the embodiment illustrated in FIG. 2 in the unstressed state.

The connector illustrated in FIG. 3 consists of the bolt 1 and nut 2 illustrated in FIG. 2 subjected to tension. The plasticity of the tensioned and tensioning parts eliminates the contact between the flanks of the threads in the section 4 of nut 2 that faces the head of bolt 1. The flanks of the thread are, due to resilience, in the same situation as in the vicinity of the free end 3 of the bolt. It should also be noted that the distribution of contact is indicated only schematically here. A tendency-dictated design can also be provided here in one direction or the other over the depth of insertion. The illustration represents the case in which the moment of friction associated with the locking device has completely vanished. The moment of friction needed to apply the requisite tension is accordingly higher.

Figure 4:
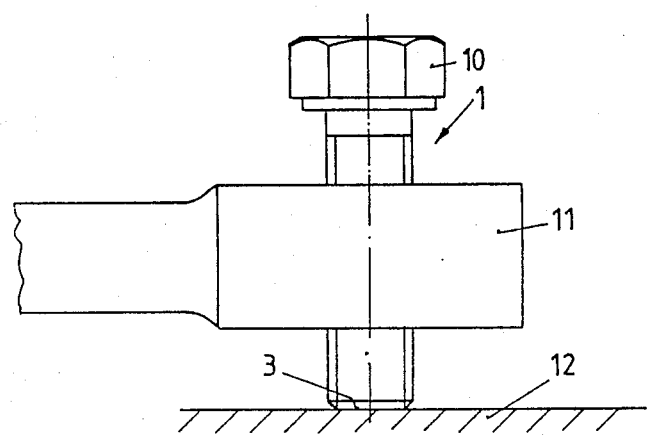
FIG. 4 illustrates a typical situation involving the use of a set screw.

FIG. 4 illustrates a situation typical for a set screw. At the same pitch difference $P_S < P_M$, the situation illustrated in FIG. 2 is valid when there is no stress. Subject to stress, compression, that is, at the threaded end of the bolt between adjusted component 11 and support 12, the flank contact will either be like that illustrated in FIG. 2 ($E_M < E_S$) or like that illustrated in FIG. 3 ($E_M > E_S$) depending on how rigid bolt 1 and adjusted component 11 are ($E_M$ is young's modulus of elasticity of the nut, and $E_S$ is the modulus of elasticity of the bolt). A reversal of pitch difference ($P_S > P_M$) is also conceivable, although this would only be practical for special applications.

The illustrations of course represent the function only in principle. Depending on the depth of insertion it can happen that not only the first and last flights come into contact but also a more or less large number of flights extending symmetrically in from the first and last flight on the nut up to half its length. Since the flights are mutually deformed only in the resilient range, the connector can be used again. Between the external and internal threads there occurs a compression that is the essential component of the locking device. This moment of friction acts in opposition to the unscrewing moment and/or to the starting moment and prevents unintended unscrewing of the nut-and-bolt type connector. The moment of friction admittedly decreases the utility of the bolt, which is additionally stressed to overcome the moment of friction at the commencement of tightening. If, however, the resilience of the connector is modified by means of design, material, surface treatment, etc. in such a way that the pitch difference and hence the moment of friction are completely or partly eliminated by means of resilient deformation in the insertion range when the tensioning forces first appear, the locking device will not decrease the utility of the bolt. If the tensioning force drops on the other hand, due to a setting motion for example, the locking device's moment of friction will reappear. This situation is also illustrated theoretically in FIG. 5, which shows the starting moment $M_A$, the unscrewing moment, $M_L$, and the tensioning force F over an angle of rotation. When a connector is assembled from a bolt 1 and a nut 2, nut 2 can initially be screwed onto bolt 1 without significant effort, with a number n of frictionless turns being completed. The maximum depth of insertion has not as yet been attained. This is followed by the point at which the axial flank clearance is occupied, surface-to-surface contact at two locations along the connector that is. Every subsequent tightening motion over the angle of rotation results in an increase in starting moment $M_A$, as will be evident from FIG. 5. When the head of bolt 1 or nut 2 comes to rest against the work piece that is to be secured by the connector, tensioning force F begins to come into action. A saddle 5 will be apparent at this point in the curve over time, meaning that the maximum starting moment has been exceeded, accompanied by a subsequent decrease and increase in the moment. This is the point at which the bolt lengthens, as illustrated for example in FIG. 3, when the moment of friction associated with the locking component vanishes completely or in part. In this range, of course, the further starting moment needed to increase tensioning force F and the aforesaid saddle shape will be derived from the sum of these two moments. The connector continues to be assembled in the initial direction of rotation until the desired tensioning force F has been applied. The maximum angle of rotation has been attained and the connector is assembled.

When the connector is unscrewed out of the assembled state, release moment $M_L$ decreases along with tensioning force F. When tensioning force F arrives at zero, a moment 6 of friction remains, the moment of friction, that is, that is solely associated with the locking component. This range as well produces a typical saddle 7.

Since the internal thread on the one hand and the external thread on the other can be manufactured on an industrial scale only to certain tolerances, employing the components together will result in a scatter on the part of the moment of friction at a constant nut height or depth of insertion. The chance position of the flanks of the external thread in relation to the internal thread within the field of tolerance will accordingly affect the course of the moment of friction of the locking component. This can be illustrated through the effect on an embodiment of a connector with a metric thread M for the nut of 10 mm outside diameter and 1.5 mm pitch, a metric thread for the bolt of 10 mm outside diameter and 1.47 mm pitch, predetermined tolerances for the nut and bolt, and a nut position or depth of insertion of 16.5 mm. The tolerance ranges of the flank diameter are nut $D_2 = 9.026$ to $9.138$ mm and bolt $d_2 = 8.941$ to $9.026$ mm.

The permutations range between the extremes
screw, maximum dimension-nut, minimum dimension
screw, minimum dimension-nut, maximum dimension.

Figure 6:
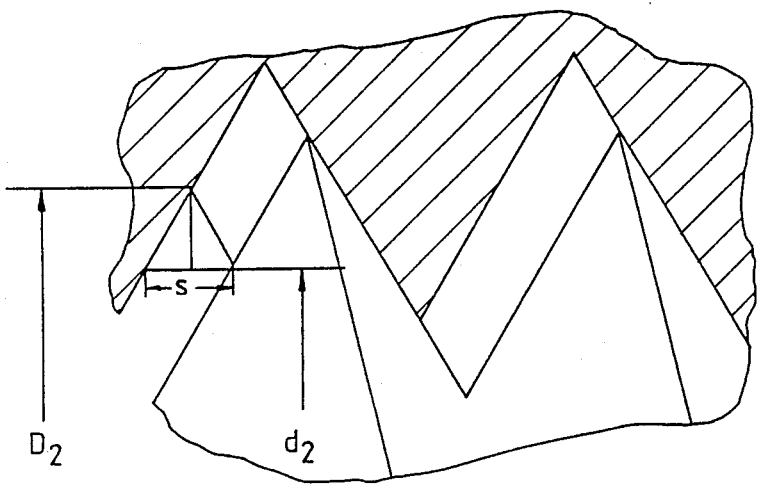
FIG. 6 illustrates flank clearance.

The axial flank clearance s in accordance with FIG. 6 can be calculated from the difference in thread-flank diameters from $$s = (D_2 - d_2) \cdot \tan 30°$$

when the flank design is conventional, with an angle of 60°.

Inserting the extreme values will result in the limiting axial flank-clearance values $$s_{min} = (9.026 - 9.026) \cdot \tan 30°$$

$$s_{max} = (9.138 - 8.941) \cdot \tan 30° = 0.11.$$

Figure 7:
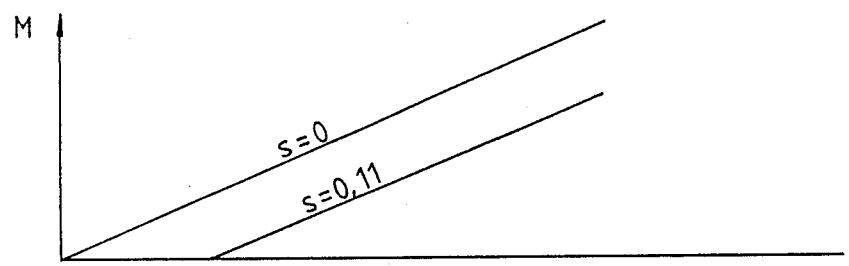
FIG. 7 illustrates axial flank clearance over the length of the nut.

When $s = 0$, the moment of friction comes into action immediately after the commencement of the screwing procedure and increases with increasing depth of insertion to attain a nut length of 16.5 mm. This situation is illustrated in FIG. 7. When $s = 0.11$, the flank clearance must initially be overcome by overcoming the number n of frictionless turns with no moment of friction M occurring. This requires $$n = \frac{s}{\delta P}$$

flights, or in the present case $$n = \frac{0.11}{.03} = 3.7.$$

Since the pitch P of the nut is 1.5, $n = 3.7$ corresponds to a nut length of 5.5 mm, so that the subsequent effective nut length is 11 mm.

Figure 8:
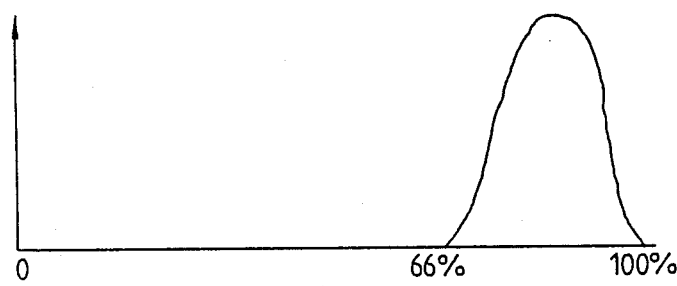
FIG. 8 is a graph of scatter.

Assuming linear relations as an approximation, the moments of friction will scatter over the range of 11 to 16.5 mm or within a field of 66 and 100%. This range of scatter is illustrated in FIG. 8. It is accordingly possible to calculate only from the lower value when designing a connector secured by a moment M of friction of this type. Depending on the situation of the flank diameters D and d of the nut and of the bolt in the field of tolerance, the point of transition between the number of frictionless turns and the number of additional turns up to maximum resilient deformation will also shift. The relation between the axial flank clearance and the number of turns needed to overcome it was calculated and determined experimentally and the two were compared, with the following results.

| D | d $(D_2 - d_2) \cdot$ tan 30° | n = s/δP (calc.) | n = s/δP (meas.) | ⌀ n |
|---|---|---|---|---|
| 9.09 | 8.86 | 0.133 | 4.4 | 5.0 |
| 9.09 | 8.86 | 0.133 | 4.4 | 5.5 | 5.0 |
| 9.09 | 8.86 | 0.133 | 4.4 | 5.0 |
| 9.09 | 8.86 | 0.133 | 4.4 | 4.5 |
| 9.09 | 8.86 | 0.133 | 4.4 | 5.0 |
| 9.09 | 8.92 | 0.098 | 3.3 | 3.5 |
| 9.09 | 8.92 | 0.098 | 3.3 | 4.0 | 3.8 |
| 9.09 | 8.92 | 0.098 | 3.3 | 3.5 |
| 9.09 | 8.92 | 0.098 | 3.3 | 4.0 |
| 9.09 | 8.92 | 0.098 | 3.3 | 4.0 |
| 9.09 | 8.95 | 0.081 | 2.7 | 3.0 |
| 9.09 | 8.95 | 0.081 | 2.7 | 3.0 | 3.2 |
| 9.09 | 8.95 | 0.081 | 2.7 | 3.5 |
| 9.09 | 8.95 | 0.081 | 2.7 | 3.0 |
| 9.09 | 8.95 | 0.081 | 2.7 | 3.5 |

The subscript 2 represents the bolts and nuts employed together in each case. It will be apparent that the measured values for the number of turns needed to exhaust the axial flank clearance s are on the average approximately 0.5 higher than the theoretical, calculated values.

To make the situation clearer, the state of maximum resilient deformation in the thread will now be calculated, specifically without the affect of axial load and assuming that the nut acts extensively rigidly. It is desirable, in order to attain an optimum locking action, to apply the tensioning force of the connector when the maximum possible moment of friction has already appeared in the thread. A constellation like that illustrated in FIG. 2 is accordingly addressed. This moment of friction M should then vanish when the tensioning force eliminates the lengthening of the bolt and hence the previously existing friction in the section 4 (FIG. 3) of the nut. The height of the nut or the depth of insertion is composed of the sum of the insertion length at n frictionless turns and the maximum resilient change $\delta 1$ in length. Simultaneously, n = number of frictionless turns
x = number of additional turns until maximum resilient deformation
$\delta 1$ = maximum resilient change in length
F = maximum tensioning force
A = tension cross-section
E = modulus of elasticity
s = axial flank clearance
P = pitch
$\delta P$ = pitch difference
1 = length of insertion at n frictionless turns.

As will be immediately evident, $$n = \frac{s}{\delta P}$$

$$\frac{\delta 1}{1} = \frac{F}{A \cdot E}$$

$$\delta 1 = \delta P \cdot x$$
$$1 = n \cdot P$$

$$\frac{\delta P \cdot x}{n \cdot P} = \frac{F}{A \cdot E}$$

$$x = \frac{n \cdot P \cdot F}{\delta P \cdot A \cdot E} = \frac{s \cdot F \cdot P}{A \cdot E \cdot \delta P^2}$$

The number of turns for various pitch differences $\delta P$ can be calculated from the aforesaid formulas for n and x with reference to an example. The following geometric conditions are valid for an M 10×1.5 thread:
$F = 4 \cdot 10^4 N$
$s = 0.1$ mm
$A = 58$ mm$^2$
$E = 20 \cdot 10^4 N/mm^2$
$P = 1.5$ mm
$n = 0.1/\delta P$
and hence

| δP | 0.005 | 0.010 | 0.015 | 0.020 | 0.025 | 0.030 |
|---|---|---|---|---|---|---|
| n | 20 | 10 | 6.7 | 5 | 4 | 3.3 |

The number of additional turns is $$x = \frac{0.1 \cdot 4 \cdot 10^4 \cdot 1.5}{58 \cdot 20 \cdot 10^4 \cdot \delta P^2} = \frac{5 \cdot 10^4}{\delta P^2}$$

and thus

| δP | 0.005 | 0.010 | 0.015 | 0.020 | 0.025 | 0.030 |
|---|---|---|---|---|---|---|
| x | 20 | 5 | 2.2 | 1.25 | 0.8 | 0.6 |

Figure 9:
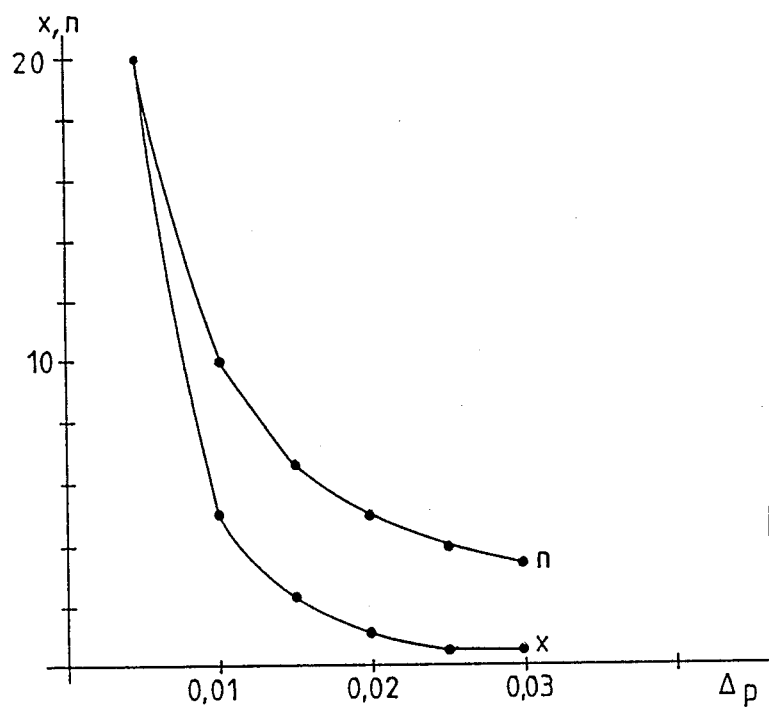
FIG. 9 is a graph of frictionless turns and of further turns in terms of pitch difference.

These results are illustrated in FIG. 9. The graph reveals an approximately hyperbolic curve for both the number n of frictionless turns and for the number x of additional turns until maximum resilient deformation. In this particular example it is practically only the range of pitch differences between 1 and 2% that is definitely reasonably useful because, when the pitch difference is even lower, the nut height increases impermissibly, whereas, with a pitch difference greater than 3% on the other hand, the resilient deformability will be exceeded even at a fraction of a turn.

Figure 10:
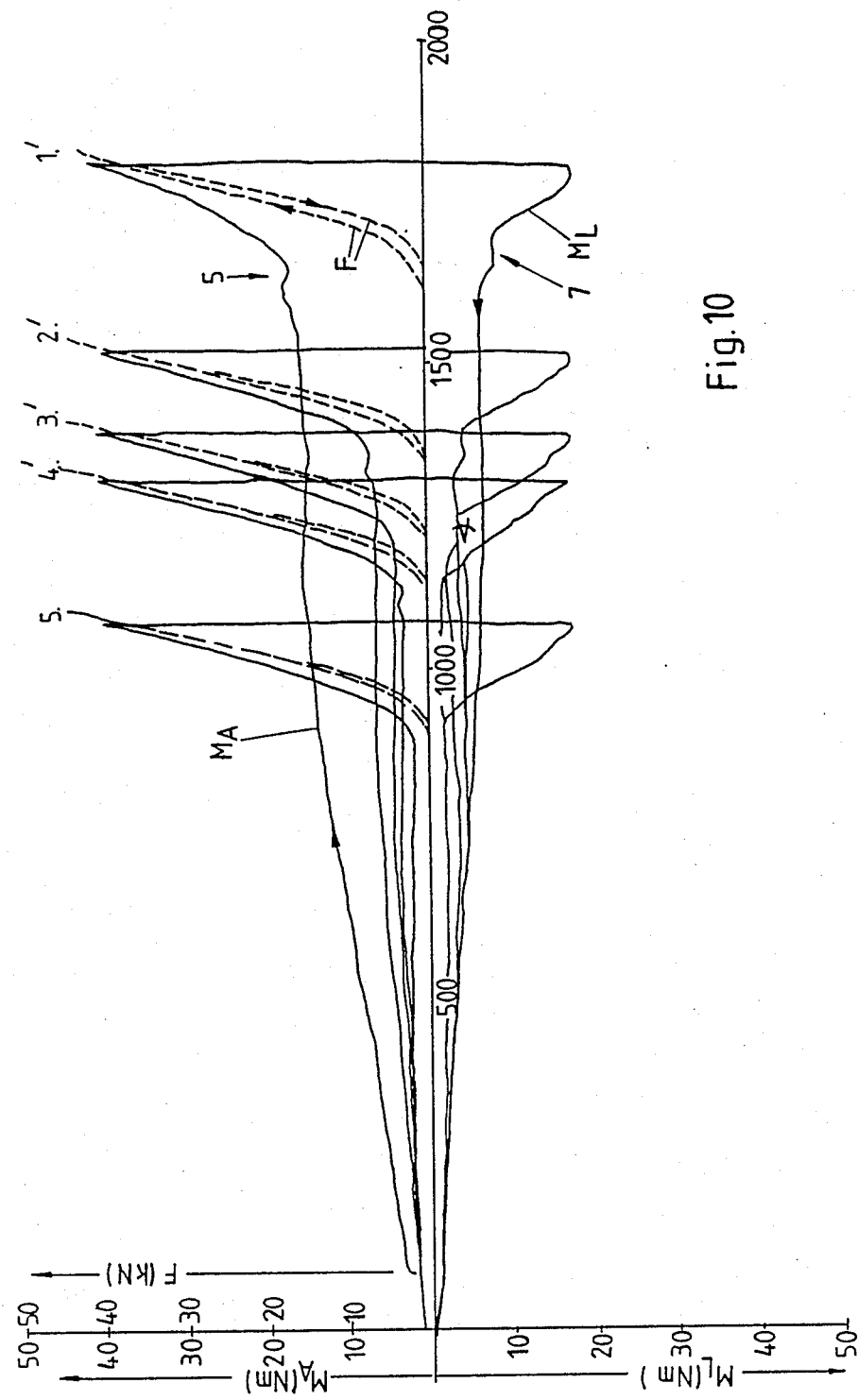
FIG. 10 is a graph of test results relating to moments and forces in terms of angle of rotation.

The previously described theoretical or calculated results were expanded with practical tests. Tests were conducted to determine the locking action of moment M of friction obtained by an intentional pitch difference between the external and internal threads. A series of five starting tests each was conducted with nuts of different heights or depths of insertion, applying a tensioning force up to a specific starting moment. FIG. 10 illustrates the results, with the moments or tensioning forces in terms of angle of rotation. The following information was derived from these tests.

The height of the nut, the depth of insertion that is, plays a decisive part in generating a reproducible locking moment. If the nut is too short, a smoothing off occurs, subsequent to one or two starting tests, that allows no further locking moment worth mentioning once the tension has decreased. If the nut is too long, plastic deformation will occur during the screwing process, leading to early freezing. Thus, reuse is extensively excluded.

A successful result was obtained in the present case (FIG. 10) with a nut 16.5 mm long, an M 10 thread, and an external-thread pitch $P_S = 1.47$. The formation of the theoretically derived saddles 5 and 7 illustrated in FIG. 5 was also confirmed by the test. At a release moment of 28 Nm a residual moment of 5.5 Nm, considered adequate for the locking component, was still attained once the tensioning force had subsided after five starts. A definite decrease in moment M of friction (saddle 5) is evident once the tensioning force has occurred when the connector us tensioned. The occurrence of the moment of friction is also evident from saddle 7 once the tensioning force decreases when the connection is released.

Tests were conducted on a jolting table to confirm the results. Simply tensioned bolts exhibited no significant decrease in tensioning force subsequent to 1500 load variations. These results are satisfactory in that the security against unscrewing is comparable to that of expensive nut-and-bolt type connectors with a toothed head-support surface.

LEGEND

Figure 5:
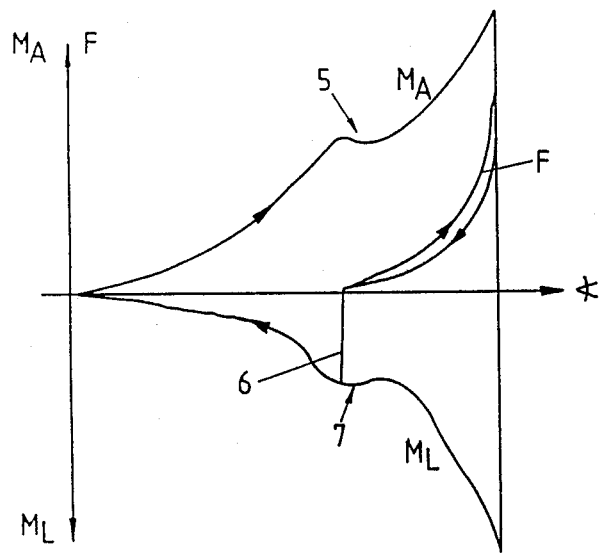
FIG. 5 is a graph of moments and forces over an angle of rotation.

FIG. 2
$P_S < P_M$
unstressed
moment of friction
FIG. 3
$P_S < P_M$
tensioned
moment of friction vanished
FIG. 5
$M_A$ = starting moment
$M_L$ = release moment
F = tensioning force
∢ = angle of rotation
FIG. 7
Nut length
FIG. 8
Frequency Scatter range

I claim:

1. A fastening connector of the nut-and-bolt type, comprising: a bolt with an external thread; a nut with an internal thread; locking means providing frictional torque resisting any unscrewing torque and comprising said external thread and said internal thread having pitches differing by substantially 1% to 2%, said external thread and said internal thread extending over one another sufficiently for said frictional torque to occur when flank clearance between said external thread and said internal thread is completely occupied and exceeded due to forces occurring only during elastic resilient deformation of the external thread and the internal thread, so that said locking means is continuously reuseable; said locking means preventing unintended loosening of the nut and bolt; overlying thread portions of said bolt and said nut lying against one another only at two end regions and in opposite directions when said nut is screwed onto said bolt in absence of a workpiece between bolt and nut, threads between said end regions being free from abutting against each other and thereby being free from load carrying function.

2. A fastening connector as defined in claim 1, wherein said nut and bolt have materials and heat treatment with sufficient resiliency for the difference in pitch and thereby frictional torque to be substantially eliminated by resilient deformation within the range of insertion of said bolt into said nut when tensioning forces occur.

3. A fastening connector as defined in claim 1, wherein the pitch of said external thread is less steep than that of said internal thread.

4. A fastening connector as defined in claim 3, wherein said resilient deformation occurs substantially at a location where the bolt is subject to tension.

5. A fastening connector as defined in claim 3, wherein said resilient deformation occurs substantially at a location where the nut is subject to compression.

6. A fastening connector as defined in claim 1, wherein the pitch of said internal thread is less steep than that of said external thread.

7. A fastening connector as defined in claim 6, wherein said resilient deformation occurs substantially at a location of the bolt when the nut is compressed.

8. A fastening connector as defined in claim 6, wherein said resilient deformation occurs substantially at a location of the nut when the bolt is tensioned.

9. A fastening connector as defined in claim 5, wherein said nut aside from said internal thread is substantially rigid when said fastening connector is a set screw.

10. A fastening connector of the nut-and-bolt type, comprising: a bolt with an external thread; a nut with an internal thread; locking means providing frictional torque resisting any unscrewing torque and comprising said external thread and said internal thread having pitches differing by substantially 1% to 2%, said external thread and said internal thread extending over one another sufficiently for said frictional torque to occur when flank clearance between said external thread and said internal thread is completely occupied and exceeded due to forces occurring only during elastic resilient deformation of the external thread and the internal thread, so that said locking means is continuously reuseable; said locking means preventing unintended loosening of the nut and bolt, said screws having symmetrical thread flanks overlying thread portions of said bolt and said nut lying against one another only at two end regions and in opposite directions when said nut is screwed onto said bolt in absence of a workpiece between bolt and nut, threads between said end regions being free from abutting against each other and thereby being free from load carrying function.

* * * * *